April 19, 1960
J. S. OVERHOLSER
2,933,714
COAXIAL ADAPTER
Filed Dec. 10, 1956
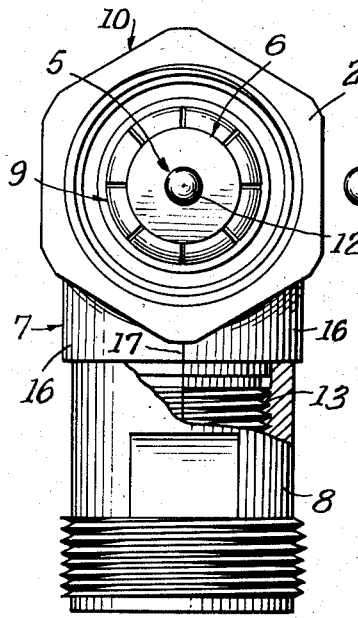
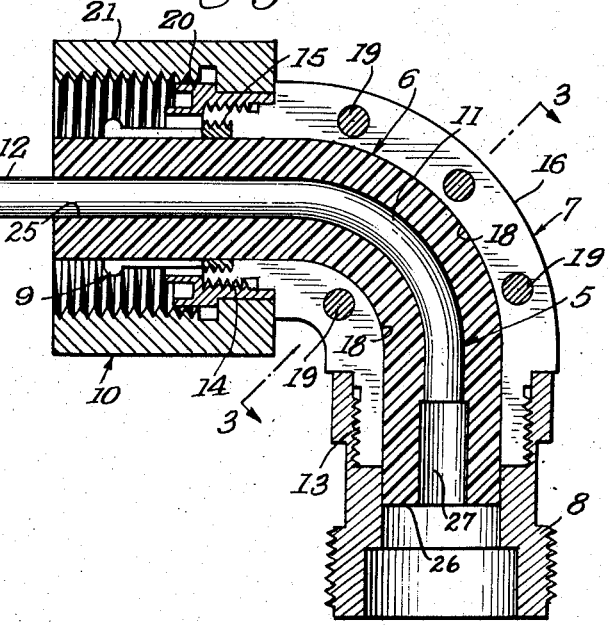
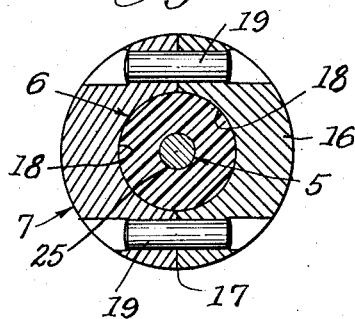
INVENTOR.
JOHN S. OVERHOLSER
BY C. G. Stratton
ATTORNEY

United States Patent Office 2,933,714
Patented Apr. 19, 1960

2,933,714

COAXIAL ADAPTER

John S. Overholser, Los Angeles, Calif., assignor to Ta-Mar, Inc., Culver City, Calif., a corporation of California Application December 10, 1956, Serial No. 627,344

2 Claims. (Cl. 339—177)

This invention relates to adapters such as used to connect coaxial cables at points where said cables change direction.

Prior adapters, as well as the present one, have angle form. Usually the angle is a right angle, the shield or body and the central probe or center conductor being required for best electronic effects to be accurately concentric within an extremely close tolerance range. A plastic material consisting of a tetrafluoroethylene polymer and known in the trade as "Teflon" is ordinarily used to hold the probe accurately centered in the shield or body.

Because of the angle formed between the opposite ends of the adapter, the only practical way heretofore used for placing the probe in the body was to divide the probe and the Teflon insulator into two miter-fitted parts that were introduced from opposite ends of the adapter and abutted somewhere between said ends of the body. In order to obtain the required accuracy, such parts necessarily had to be carefully prepared and designed for accurate interfit. Hence, even if satisfactory in use, the production costs were inordinately high.

Accordingly, it is an object of the present invention to provide a coaxial adapter in which both the probe and the insulator in which the same is disposed are single and continuously-formed elements disposed in proper concentricity within an elbow body and which, therefore, can be produce more economically than two-part elements.

Another object of the invention is to provide an angle adapter of the character referred to in which the outer-conductor, shield or housing body is divided to enable placing of an insulation-enclosed probe of angle form within said housing, with assurance of proper accuracy of concentricity between the housing and the probe.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes, one embodiment of the present invention, which is given by way of illustration or example only.

In the drawing, like reference characters designate similar parts in the several views.

Fig. 1 is an end elevational view of a coaxial adapter according to the present invention.

Fig. 2 is a longitudinal central sectional view thereof.

Fig. 3 is a cross-sectional view as taken on line 3—3 of Fig. 2.

The adapter that is illustrated comprises, generally, a probe or center conductor 5, an insulating member 6 enclosing said probe, an outer-conductor body 7 around the member 6 continuously engaged with and contacting the member 6, a connector 8 at one end of the body for connecting the adapter to the end of a coaxial cable, a member 9, at the opposite end of the body, for effecting a conductive connection between the body and a second coaxial cable, and means 10 for connecting said body to said second cable.

The probe 5, in the present instance, comprises a single length of suitably electrically conductive metal, the same being formed to have an arcuate bend 11 and a longer end 12 that projects from the adapter end that is provided with the means 10. Said probe is conventionally made of round-sectioned rod and the end 12 thereof is rounded over, as shown.

The insulating member 6 is formed as a sleeve or tube into which said probe is fitted, the latter being accurately concentric with respect to the outer surface of member 6. As hereinbefore disclosed, member 6 is of high electrical quality, being highly dielectric and of low loss to insulate high-frequency current and also withstand extremes of temperature in a range as great as —75° to +250° C. The plastic consisting of a tetrafluoroethylene polymer and marketed under the trade name Teflon is preferred as the material from which member 6 is made. While this material has no true melting point, the same undergoes a solid-phase transition to a gel at 325° C. However, without material loss of strength, the member 6 may be transformed from a straight tubular form to the angle form shown under an application of heat of about 175° C.—a temperature that will soften the Teflon sufficiently so that it may be formed and yet not so high as to approach the solid-phase transition. Thus, the 175° C. temperature given is intended as exemplary since plus or minus variations thereof may be employed for the instant purpose. Upon return to room temperature, the Teflon member will have its original characteristics. The only difference will be that of shape.

It will be understood that the probe 5, as a straight rod member, is inserted into the axial hole 25 of the Teflon tube, when the latter is straight. In this condition, the bending of the Teflon and the probe is effected, as hereinabove indicated, and the resultant unit comprises an insulation-covered probe or conductor that is formed on a continuous curve with two ends that are angularly related. As shown, the curve is preferably 90° and the angular relationship of the ends is also at a right angle.

It will be noted from Fig. 2 that the end of the probe 5 that is opposite to the extension 12, terminates short of the end 26 of the insulator 6, a counterbore 27 being formed in said end of the insulator, the probe end being directed toward said counterbore. The length of said counterbore is approximately that of the length of probe extension 12.

The body 7 is formed as an elbow having outer threads 13 at one end, outer threads 14 and internal threads 15 at the other end. According to the invention, the body 7 comprises similar but opposite halves 16 that join along a seam or line 17 that is preferably disposed on the longitudinal center of the adapter. Said halves 16 are each formed to have a semi-circular seat or passage 18, the two seats cooperating to constitute a bore into which the member 6 is fitted. Such bore, ideally, has the size and form of the member 6 and, therefore, confines the same to an exact position within the body.

It will be realized that the body halves 16 may be separated, the insulated probe placed in the bore thereof, and the halves brought together to join along the seam 17. Now, rivets 19 may be applied to connect the halves although, if desired, temporary screws may first be used to connect the halves and then replaced by the rivets.

When the threads 13, 14 and 15 are formed is not vital. The same may be provided in each half in a manner to match up when the halves are joined, or they may be cut into the halves after assembly. In any case, connector 8 is engaged with thread 13, and member 9 is connected to internal thread 15. The connecting means 10 is shown as a retainer 20 on the external threads 15, and a nut 21 held in place by said retainer so as to swivel axially.

The particular form of the elements 8, 9, 20 and 21 may be varied. The same, being annularly complete, cooperate with the rivets 19 to complete the integration of the body halves into an elbow housing for the insulation-covered probe.

While the foregoing has illustrated and described what is now contemplated to be the best mode of carrying out my invention, the construction is, of course, subject to modification without departing from the spirit and scope of the invention. It is, therefore, not desired to restrict the invention to the particular form of construction illustrated and described, but to cover all modifications that may fall within the scope of the appended claims.

Having thus described my invention, what I claim and desire to secure by Letters Patent is:

1. A coaxial adapter comprising a tubular insulator having its ends at an angle to each other with the insulator bent on a curve between said ends, the insulator having a round cross-section and the bore therein being round and concentric with the outer surface of the insulator, a round-sectioned metal rod tightly fitted in said bore and following the curve in the insulator, said rod, thereby, being centered with respect to the outer surface of the insulator, one end of the rod extending beyond one end of the insulator and the other rod end terminating inward of the opposite end of the insulator, a two-part outer conductor body having a curved bore of circular cross-section into which said insulator is tightly fitted, said rod, thereby, being concentric with the bore of said body, said body being split into its two parts on a plane that is common to the plane on which the curvature of both the rod and insulator resides, means to secure together the two parts of the body, the end of the insulator from which the rod extends extending beyond the body, and the opposite insulator end terminating inward of the other end of the body.

2. A coaxial adapter according to claim 1 in which the end of the body that is adjacent to the end of the insulator that extends therefrom being provided with a rotational connector that, at least partly, surrounds the insulator extension and is concentric with said extension and the rod that extends therefrom, and the portion of the insulator that has the inwardly-terminating end of the rod being provided with an end-counterbore toward which said rod end is directed, said counterbore being approximately as long as the rod extension at the opposite end.

References Cited in the file of this patent
UNITED STATES PATENTS

| | | |
|---|---|---|
| 2,328,373 | Bogardus | Aug. 31, 1943 |
| 2,376,324 | Bogardus | May 22, 1945 |
| 2,402,049 | Ingalls | June 11, 1946 |
| 2,616,314 | Zeller | Nov. 4, 1952 |
| 2,673,233 | Salisbury | Mar. 23, 1954 |
| 2,718,052 | Dexter | Sept. 20, 1955 |
| 2,755,331 | Melcher | July 17, 1956 |

OTHER REFERENCES

Amphenol Engineering News, September-October 1956, page 379.